United States Patent
Chandrasekaran et al.

(10) Patent No.: US 11,157,540 B2
(45) Date of Patent: Oct. 26, 2021

(54) SEARCH SPACE REDUCTION FOR KNOWLEDGE GRAPH QUERYING AND INTERACTIONS

(71) Applicant: International Business Machines Corporation, Armonk, NY (US)

(72) Inventors: Swaminathan Chandrasekaran, Coppell, TX (US); Joseph Max Kaufmann, Austin, TX (US); Lakshminarayanan Krishnamurthy, Round Rock, TX (US); Edward Eugene Seabolt, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 15/262,751

(22) Filed: Sep. 12, 2016

(65) Prior Publication Data

US 2018/0075070 A1  Mar. 15, 2018

(51) Int. Cl.
*G06F 16/36* (2019.01)
*G06F 16/242* (2019.01)
*G06F 16/33* (2019.01)

(52) U.S. Cl.
CPC .......... *G06F 16/367* (2019.01); *G06F 16/242* (2019.01); *G06F 16/3346* (2019.01); *G06F 16/3347* (2019.01)

(58) Field of Classification Search
CPC .... G06F 16/36; G06F 16/367; G06F 16/3346; G06F 16/3347; G06F 16/242
See application file for complete search history.

(56) References Cited

U.S. PATENT DOCUMENTS

| | | | |
|---|---|---|---|
| 7,769,751 B1* | 8/2010 | Wu | G06F 16/335 707/728 |
| 8,359,191 B2* | 1/2013 | Chen | G06F 16/367 707/734 |
| 8,538,904 B2 | 9/2013 | Fokoue | |
| 8,812,495 B1 | 8/2014 | Pragada et al. | |
| 9,135,571 B2* | 9/2015 | Delaney | G06F 16/367 |
| 2001/0044795 A1* | 11/2001 | Cohen | G06F 17/30699 |
| 2003/0037034 A1* | 2/2003 | Daniels | G06Q 10/087 |
| 2005/0055357 A1* | 3/2005 | Campbell | G06F 8/61 |

(Continued)

OTHER PUBLICATIONS

Anonymously, "Simultaneous Expert, Project, and Document Search Using Knowledge Graph", http://ip.com/IPCOM/000242152, Jun. 19, 2015, 7 pages.

(Continued)

*Primary Examiner* — Ashish Thomas
*Assistant Examiner* — Jedidiah P Ferrer
(74) *Attorney, Agent, or Firm* — Haley J. McClory (57) ABSTRACT

A search space can be reduced using a pruned ontology that comprises entities from an initial ontology. A document corpus having a plurality of documents is received for processing. An ontology pruner determines a set of entities in the plurality of documents. For each entity in the set of entities, the ontology pruner determines a link for the entity in the initial ontology. The ontology pruner determines a score for the entity based on information obtained through the link for the entity in the initial ontology. The ontology pruner omits the entity from the pruned ontology if the score is below a predetermined or configurable threshold value.

20 Claims, 5 Drawing Sheets

(56) References Cited

U.S. PATENT DOCUMENTS

| | | | | |
|---|---|---|---|---|
| 2006/0004747 | A1* | 1/2006 | Weare | G06F 17/30734 |
| 2009/0119095 | A1* | 5/2009 | Beggelman | G06F 40/30 |
| | | | | 704/9 |
| 2010/0185577 | A1* | 7/2010 | Tsaparas | G06N 20/00 |
| | | | | 706/52 |
| 2010/0280989 | A1* | 11/2010 | Mehra | G06F 17/30734 |
| | | | | 706/59 |
| 2013/0262449 | A1* | 10/2013 | Arroyo | G06F 16/3325 |
| | | | | 707/722 |
| 2013/0290319 | A1* | 10/2013 | Glover | G06F 17/3053 |
| | | | | 707/723 |
| 2014/0258304 | A1 | 9/2014 | Sabanski | |
| 2014/0280307 | A1* | 9/2014 | Gupta | G06F 17/30657 |
| | | | | 707/769 |
| 2015/0331877 | A1 | 11/2015 | Lou et al. | |
| 2015/0332670 | A1 | 11/2015 | Akbacak et al. | |
| 2016/0179945 | A1* | 6/2016 | Lastra Diaz | G06F 16/24522 |
| | | | | 707/739 |

OTHER PUBLICATIONS

King, et al., "Exploring the use of Domain Knowledge for Query Processing Efficiency", http://ip.com/IPCOM/000150681, Apr. 19, 2007, 25 pages.

Moustafa, et al., "Subgraph pattern matching over uncertain graphs with identity linkage uncertainty", IEEE 30th International Conference on Data Engineering, 2014, 12 pages.

* cited by examiner

SEARCH SPACE REDUCTION FOR KNOWLEDGE GRAPH QUERYING AND INTERACTIONS

BACKGROUND

Embodiments of the inventive subject matter generally relate to the field of computers, and, more particularly, to reducing a search space for queries and other interactions with knowledge graphs.

Computerized database and the connectivity provided by the Internet has made an almost overwhelming amount of information available for search by users such as students, research scientists or anyone else with access to a computing device. Question and Answer (Q/A) systems have been developed to assist such searches, which may take an input question, analyze it, and return results indicative of the most probable answer to the input question. Q/A systems provide automated mechanisms for searching through large sets of documents, and analyze them with regard to an input question to determine an answer to the question. Often, information that is made available for searches is in the form of an ontology or knowledge graph. A knowledge graph is a structured graph based dataset of information. In can be problematic to search a large, generic knowledge graph because there can be multiple different meanings for a single term, resulting in ambiguity. For example, the term "lime" in a search query can refer to a fruit, a material, a place, a name of a band, a magazine name, etc.

SUMMARY

Systems, methods and computer program products of varying scope reduce a search space using a pruned ontology that comprises entities from an initial ontology. A document corpus having a plurality of documents is received for processing. An ontology pruner determines a set of entities in the plurality of documents. For each entity in the set of entities, the ontology pruner determines a link for the entity in the initial ontology. The ontology pruner determines a score for the entity based on information obtained through the link for the entity in the initial ontology. The ontology pruner omits the entity from the pruned ontology if the score is below a predetermined or configurable threshold value.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although examples refer to a Q/A system, the systems, methods and techniques may be implemented in any type of system that processes queries for a domain of information. In other instances, well-known instruction instances, protocols, structures and techniques have not been shown in detail in order not to obfuscate the description.

Figure 1:
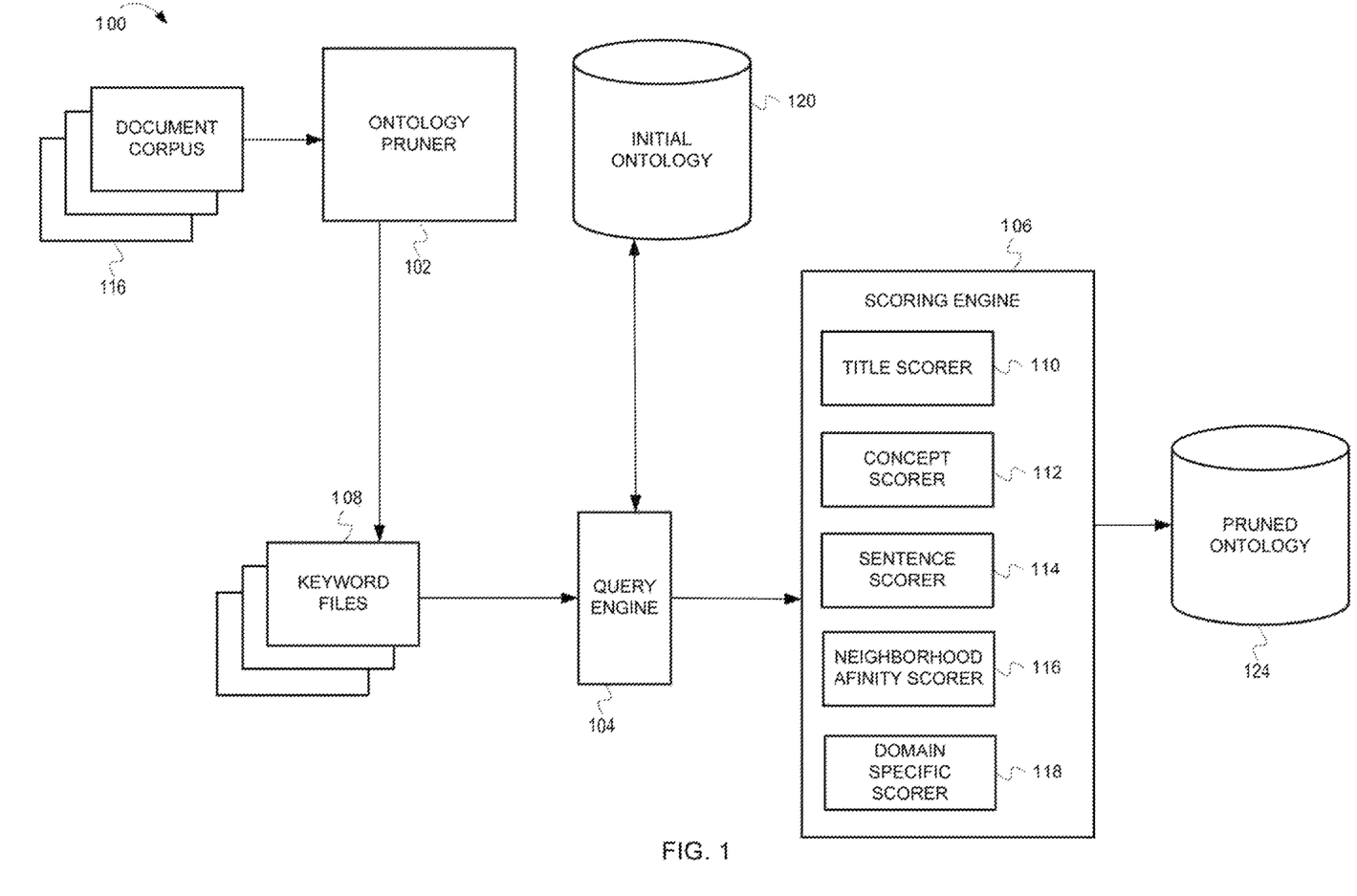
FIG. 1 depicts a system for reducing a search space and scoring queries in the reduced search space.

FIG. 1 depicts elements of a system for reducing a search space and scoring queries in the reduced search space. The search space can be an ontology (also referred to as a knowledge graph), and the reduced search space can be a subset of the ontology. In some aspects, a Q/A system 100 includes an ontology pruner 102, a query engine 104, and a scoring engine 106. Ontology pruner 102 can process an initial ontology 120 using a document corpus 126 to identify information in initial ontology 120 that is relevant to concepts found in the document corpus 126. Ontology pruner 102 can then create a pruned ontology 102 that contains the relevant information in initial ontology 120 and does not contain information that is not relevant to the concepts in document corpus 126.

In some aspects, initial ontology 120 can be based on a large general purpose collection of information. Examples of such collections are DBpedia, Freebase, Opencyc and Yago. Information about DBpedia can be found at the URL "http://wiki.dbpedia.org/". In some aspects, initial ontology 120 can be maintained in Resource Description Format (RDF). The information in the initial ontology 120 can be accessed using a query language. For example, in some aspects, SPARQL (SPARQL Protocol and RDF Query Language) can be used to query the initial ontology 120 for information.

Document corpus 126 comprises a collection of documents. As used herein, a document may be a file, database object, or other data container that includes text that may be used to answer questions posed to the Q/A system 100. The content may be primarily textual in nature, as in the case of electronic journal articles. While the primary content in the document may be textual in nature, a document may include other forms of content having associated text. For example, a document may have primarily graphical content, with metadata in text form that describes the graphical content. In some aspects, the document corpus may be focused on a particular domain (also referred to as a topic). For example, a document corpus focused on a cooking domain may contain documents related to recipes, cooking techniques and ingredients. A document corpus that is focused on a health care domain may be dedicated to documents that contain documents relevant to health care. A document corpus that is focused on financial information will contain documents relevant to finance. While a document corpus may be dedicated to a particular domain, the aspects of the disclosure are not limited to any particular domain.

Ontology pruner 102 can analyze document corpus 126, identify topics and/or concepts in the document corpus 126, and create keywords associated with the identified topics and concepts. The keywords can be inserted into keyword files 108. The keyword files 108 can be submitted to a query engine 104 that uses the keywords to issue queries to initial ontology 120 for information related to the keywords. In some aspects, the queries can be SPARQL queries that return RDF triples as results. The query results can be submitted to scoring engine 106 that can score the query results based on various factors. The query results having a score above a predetermined or configurable threshold can be added to the pruned ontology.

Scoring engine 106 produces a score for query results based on various factors. In some aspects, scoring engine 106 can include a title scorer 110, a concept scorer 112, a sentence scorer 114, a neighborhood affinity scorer 116, and a domain specific scorer 118. Title scorer 110 determines a score based on how well the query matches the title of a candidate document in the ontology. In some aspects, the score can be based on an edit distance between the query and the title of the document.

Concept scorer 112 determines a score based on how well concepts in the query match predefined concepts in the candidate document. In some aspects, the concept scorer parses text fields of a candidate document for nouns. A hypernym graph can be constructed for the nouns in the document. The nouns in the query can be compared against the hypernym graph to determine a score representing how well the query matches the text fields of the candidate document.

Sentence scorer 114 can utilize a gloss (i.e., a dictionary for Natural Language Processing (NLP)) to determine a score. In some aspects, abstracts from the initial ontology 120 are parsed into sentences. Tokens from a query sentence can be compared with tokens in the sentences of the abstract can be compared to determine a sentence score. It can be desirable to use the abstract because the abstract is typically concise and contains highly relevant information. Thus, the abstract is less likely to contain terms that are considered noise with respect to a query. In alternative aspects, other information from the ontology can be used in addition to, or instead of, the abstract.

Neighborhood affinity scorer 116 determines a score based on previous searches performed by neighbors of a current user. The determination of what comprises a neighbor can be based on location, interests (e.g., a shared interest in cooking), demographics (age, gender, etc.) or other category. In some aspects, users can provide information in a user profile. In alternative aspects, a user profile can be inferred using techniques known in the art. Clustering techniques can be applied to the profiles to determine neighborhoods of profiles.

Domain specific scorer 118 can determine a score based on a domain relevant to the document corpus. In some aspects, a domain for the document corpus is determined. For example, a document corpus may comprise recipes. If a query uses the term "lime", the domain specific scorer can determine a score based on the assumption that the term lime refers to food, and not the geographic location Lime, Oreg.

Further details on the operation of system 100 are provided below with reference to FIG. 2 and FIG. 3.

Figure 2:
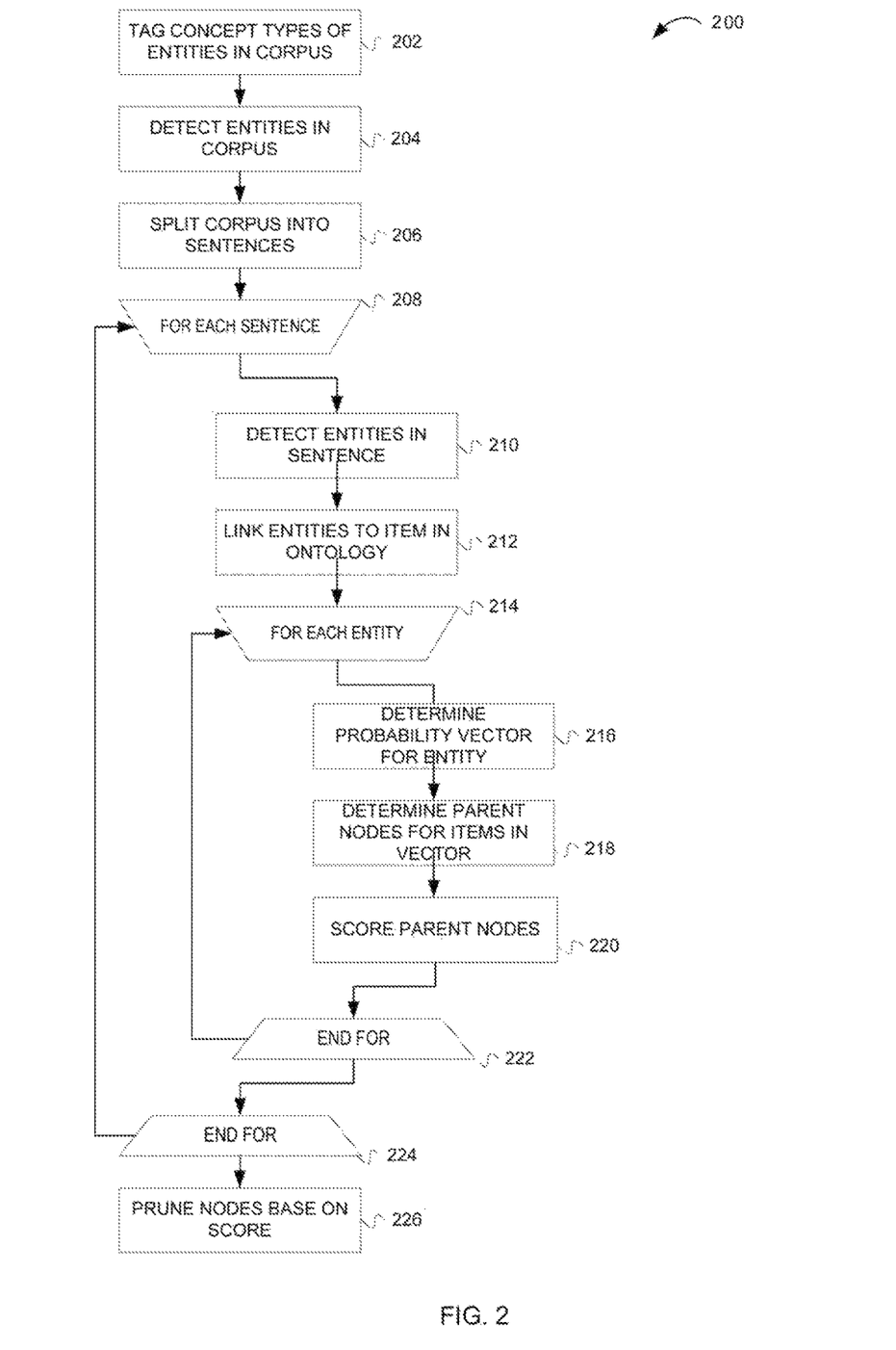
FIG. 2 is a flow chart illustrating a method for pruning an ontology.

FIG. 2 is a flow chart 200 illustrating a method for pruning an ontology. The method begins at block 202 by tagging concept types of entities in a document corpus 126. In some aspects, an entity detector or entity extraction toolkit (e.g., SIRE) can be used to tag the concept types. An entity can be any proper noun such as a person or specific location. A concept can be a topic. A concept type describes the concept represented by a particular entity. As an example of the above, the name "Barack Obama" can be a person entity. A concept associated with the name can be "leader."

At block 204, an entity detection apparatus can be used to detect entities in the document corpus 126.

At block 206, the document corpus 126 is split into sentences.

Block 208 is the beginning of a loop that is processed for each sentence in the document corpus.

At block 210, the entities in the sentence are detected. For example, the entity detection apparatus can be used to detect the entities in the sentence.

At block 212, the entities in the sentence are linked to an item in the initial ontology 120. A list of entities for the sentence can be created.

Block 214 is the beginning of a loop that is processed for each entity in the list of entities in the sentence.

At block 216, a probability vector for the entity is determined. The probability vector can link the entity to several categories in the initial ontology 120, where a category can be a location in the ontology (e.g., a location in a tree representing the ontology). For example, an entity named "Berlin" can have a probability vector of [(Berlin, Germany: 0.9), (Berlin, Ga.: 0.3)] indicating that it is more likely that the term "Berlin" refers to "Berlin, German" than "Berlin, Ga."

At block 218, the parent nodes of the items in the probability vector can be determined. For example, the parent node for an item named "Capital City" can be "City," which in turn can have a parent node of "Location" (e.g., Capital City→City→Location).

At block 220, scores for the parent nodes are determined. In some aspects, a decay factor is used to adjust the score according to how far removed the parent is from the original entity. For the purposes of the example, assume a decay factor of 0.7. Thus, for the first item in the above example vector (Berlin, Germany: 0.9), the resulting scores would be [(Capital City: (0.9*0.7)), (City: (0.9*0.7*0.7)]. For the second item in the above example vector (Berlin, Ga.: 0.3) the resulting scores would be [(Capital City: (0.3*0.7)), (City: (0.3*0.7*0.7)]. These scores can be combined or added together to produce a final vector for the node in the initial ontology that represents the item.

Block 222 is the bottom of the loop that processes entities in the sentence. If further entities remain to be processed, the method returns to block 214 to process the next entity in the sentence. If all entities in the sentence have been processed, the method proceeds to block 224.

Block 224 is the bottom of the loop that processes sentences in the document corpus 126. If sentence remain to be processed, the method returns to block 208 to process the next sentence. If no sentences remain to be processed, the method proceeds to block 226.

At block 226, the ontology is pruned based on the scores determined at block 220. The scores can be a measure of how well represented a category is within the document corpus 126. In some aspects, nodes having a score less than a predetermined or configurable threshold value are removed from the initial ontology 120. The value for the threshold can be determined by a user. The specific value chosen will reflect whether the user wants to favor precision versus recall. The remaining nodes comprise pruned ontology 124, which can be used for subsequent queries or other downstream processing. It should be noted that the pruned ontology can be created in other ways using the scoring methodology described above. For example, the initial ontology 120 can be created by adding entities to pruned ontology 124 whose score is above the threshold, and omitting entities whose score is below the threshold.

Figure 3:
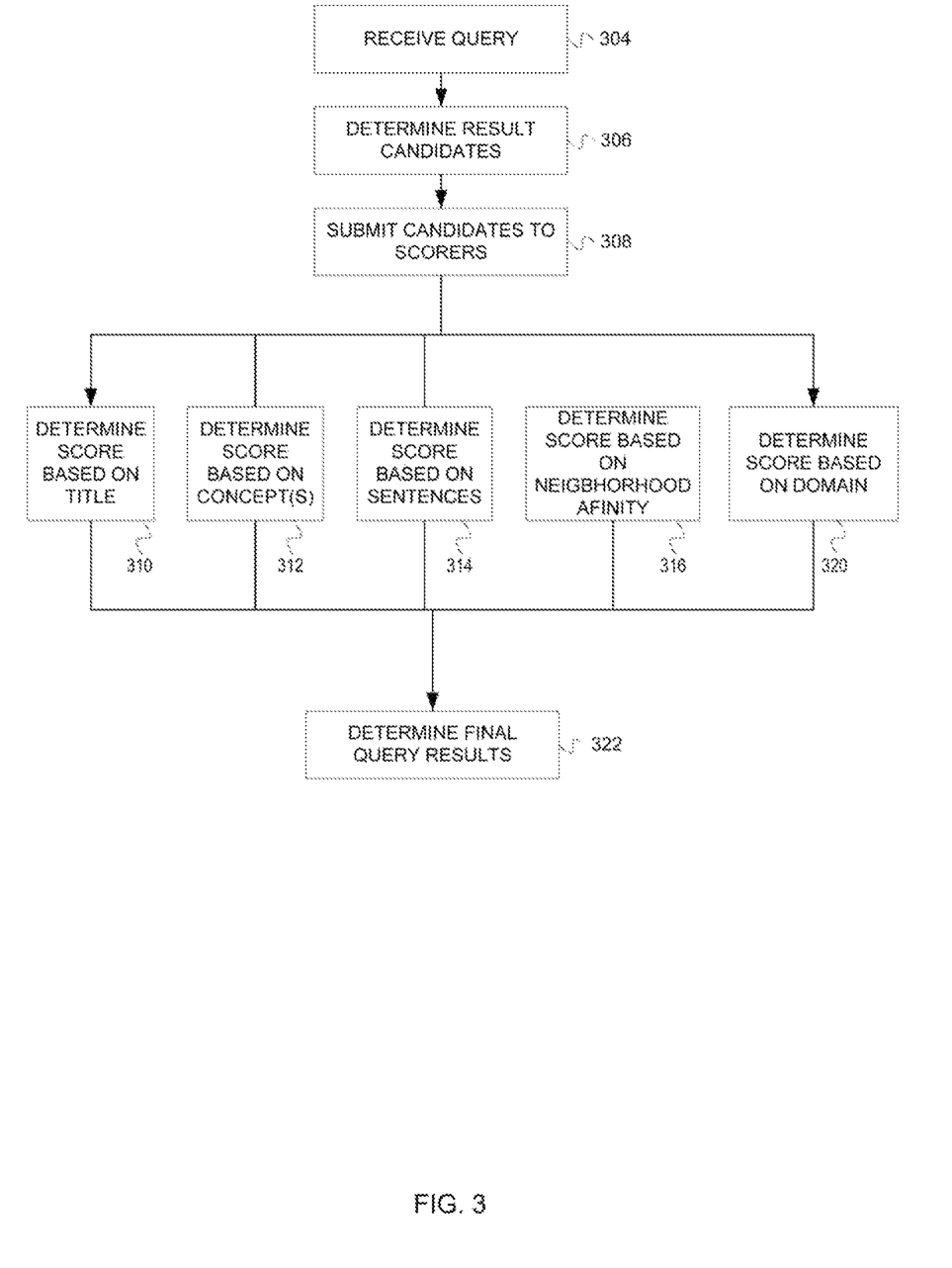
FIG. 3 is a flow chart illustrating a method for reducing a search space and scoring queries in the reduced search space.

FIG. 3 is a flow chart 300 illustrating a method for scoring queries. At block 304, a query is received. The query can comprise one or more keywords, or can be in the form of a sentence. The query can be run against an ontology such as initial ontology 126 or a pruned ontology 124.

At block 306, one or more result candidates are received in response to the query. The result candidates represent possible matches to the query or possible answers to the query.

At block 308, the one or more result candidates are scored based on different scoring techniques. As illustrated in FIG. 3, the result candidates can be scored using the different techniques in parallel. However, the different techniques can be applied in a serial manner. FIG. 3 illustrates the application of five scoring techniques. Those of skill in the art having the benefit of the disclosure will appreciate that other scoring techniques can be used, and that not all of the five scoring techniques illustrated in FIG. 3 are required to produce a final score.

At block 310, a title score can be determined based on how well the query matches the title of a candidate document in the ontology. In some aspects, the score can be based on an edit distance between the query and the title of the document.

At block 312, a concept score can be determined based on how well concepts in the query match predefined concepts in the candidate document. In some aspects, the text fields of a candidate document are parsed for nouns. A hypernym graph can be constructed for the nouns in the document. The nouns in the query can be compared against the hypernym graph to determine a concept score representing how well the query matches the text fields of the candidate document.

At block 314, a sentence score can be determined. A gloss can be used to determine a score. In some aspects, abstracts from the initial ontology 120 are parsed into sentences. Tokens from a query sentence can be compared with tokens in the sentences of the abstract to determine a sentence score.

At block 316, a neighborhood affinity score can be determined based on previous searches performed by neighbors of a current user. The determination of what comprises a neighbor can be based on location, interests (e.g., a shared interest in cooking), demographics (age, gender, etc.) or other category. In some aspects, users can provide information in a user profile. In alternative aspects, a user profile can be inferred using techniques known in the art. Clustering techniques can be applied to the profiles to determine neighborhoods of profiles.

At block 318, a domain score can determined based on a domain relevant to the document corpus. In some aspects, a domain for the document corpus is determined. For example, a document corpus may comprise recipes. For example, if a query uses the term "lime", the domain specific scorer can determine a score based on the assumption that the term lime refers to food, and not the geographic location Lime, Oreg.

At block 320, a final score is determined based on one or more of the title score, the concept score, the sentence score, the neighborhood affinity score, and the domain score. The component scores can be weighted to determine the final score.

Figure 4:
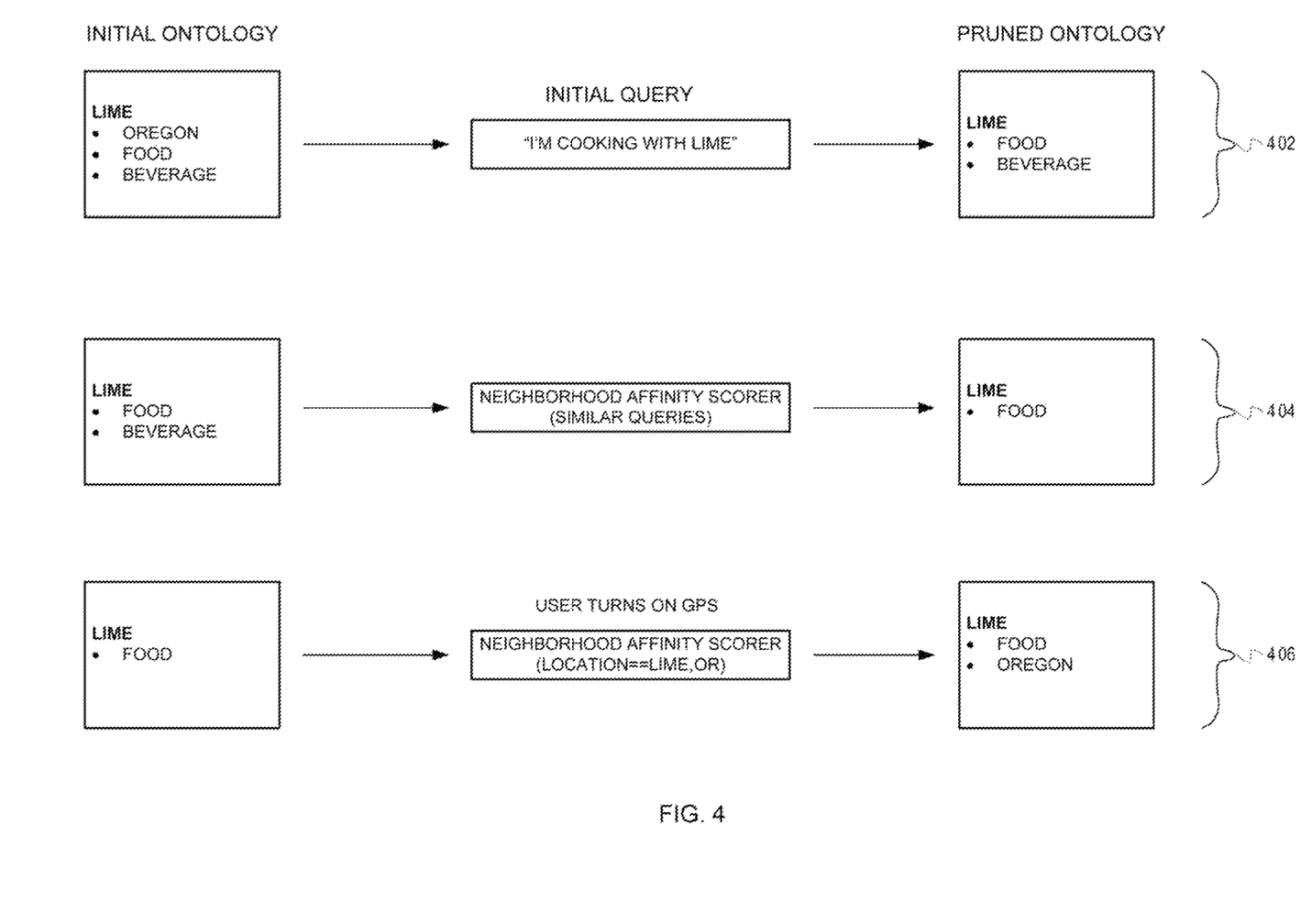
FIG. 4 illustrates iteratively pruning an ontology, including an example query and example results.

FIG. 4 illustrates iteratively pruning an ontology, including an example query and example results. Using such iterative pruning, future searches can be made more relevant based on previous searches. Three iterations of queries are illustrated in the example illustrated in FIG. 4. In a first iteration 402, an initial ontology includes categories of "Oregon", "Food" and "Beverage" for the term "Lime." An initial query of "I'm cooking with lime" results in a pruned ontology where "Oregon" is pruned based on the determination from the query that location is not relevant.

Adding a new neighborhood affinity scoring during a second iteration 404 results in the category "Beverage" being pruned from the ontology. For example, a neighborhood affinity scoring may determine that based on that users having similar demographic information to the current user that submitted similar queries were interested in cooking food, and were not interested in beverages. As a result, the "Beverage" category is pruned from the ontology.

It will be appreciated that in the above two examples (iterations 402 and 404), information is pruned from the ontology. In some cases, such pruning may inadvertently result in useful information being removed from the pruned ontology.

However, it is possible to add information back in to the ontology. For example, during a third iteration 406, it may be determined, based on location information about the user (e.g., if the user turns on a GPS on their phone), that the user is in or near Lime, Oreg. Using this information, the location Lime, Oreg. can be added back into the pruned ontology, so that future queries may be more accurate. Alternatively, the additional information may "added" to the pruned ontology by not removing the information from an initial ontology used to create the pruned ontology.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
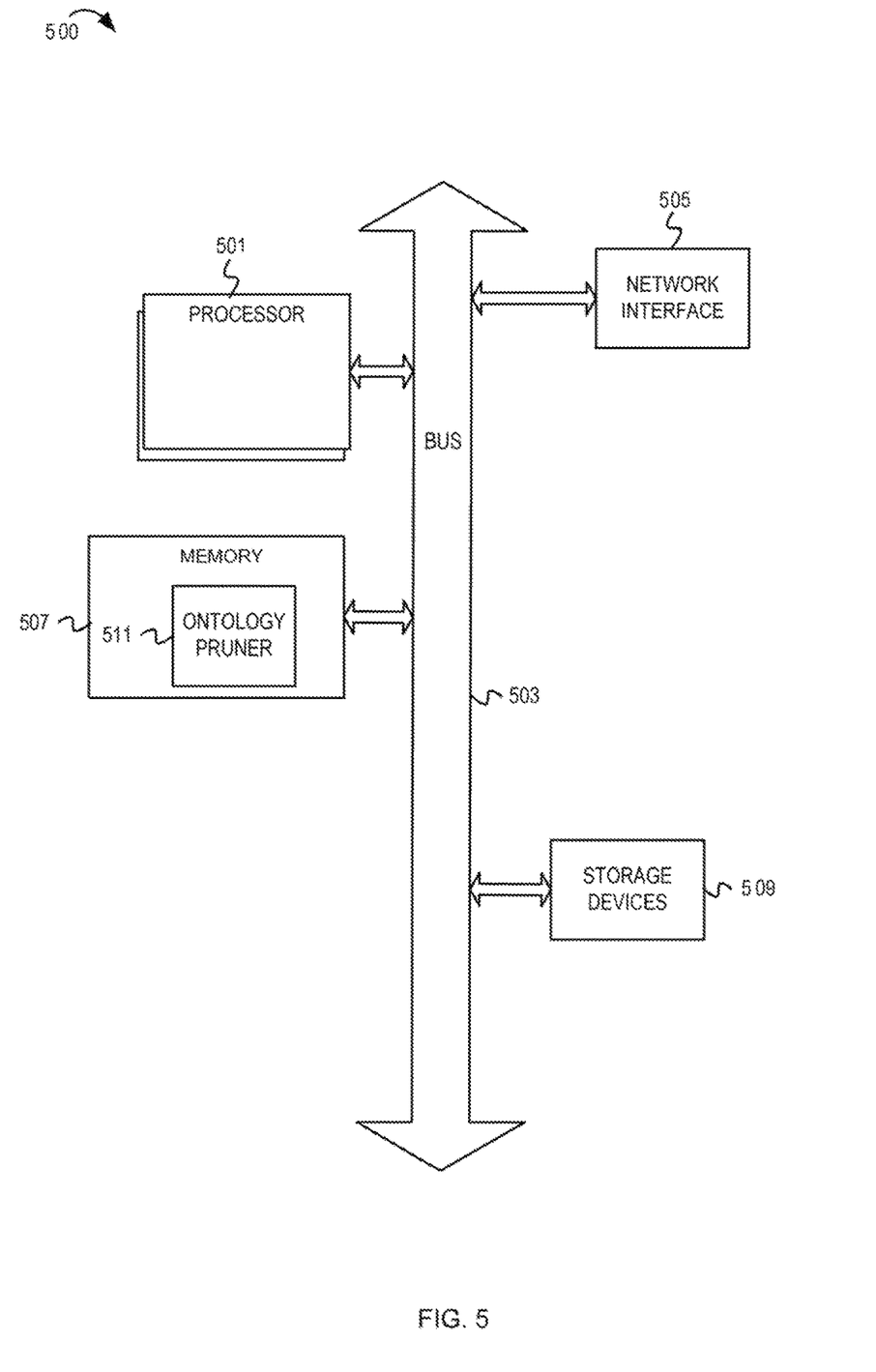
FIG. 5 depicts an example computer system.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The system memory 507 embodies functionality to implement embodiments described above. The system memory 507 may include one or more functionalities that facilitate reducing a search space for a general purpose ontology to an ontology for a specific domain. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

Memory 507 may include an ontology pruner 511 that implements the above-described methods to produce a pruned ontology from a larger general interest ontology.

While the embodiments are described with reference to various implementations and exploitations, it will be understood that these embodiments are illustrative and that the scope of the inventive subject matter is not limited to them. In general, techniques for reducing a search space of an ontology for a specific domain as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method for ontology generation, the method comprising:
receiving, via one or more processors, a document corpus having a plurality of documents;
determining, via at least one of the processors, a set of entities for a sentence in the plurality of documents; and
for an entity in the set of entities:
generating a set of search keywords that are associated with the entity;
executing a query against the plurality of documents using the set of search keywords;
determining a link to a first node in an initial ontology based on a keyword-based search result of the query, wherein a search result indicates that the first node is associated with a plurality of first categories in the initial ontology based on an association between a keyword in the set of search keywords and the first node;

creating a probability vector associated with the plurality of categories, wherein the probability vector indicates first likelihoods the entity refers to each of the plurality of first categories;

determining parent nodes to the first node in the initial ontology, wherein the parent nodes are associated with a plurality of second categories;

indicating, in the probability vector, second likelihoods the entity refers to the plurality of second categories, wherein the second likelihoods are less than the first likelihoods;

determining, via a scoring engine operating via at least one of the processors, a score for the entity based, at least in part, on the first likelihoods and the second likelihoods; and generating a new ontology by removing, via an ontology pruner operating via at least one of the processors, the entity from the initial ontology if the score is below a predetermined or configurable threshold value, wherein the ontology pruner iteratively prunes the entity from the new ontology via a plurality of iterations, wherein each of the plurality of iterations is based on a different type of scoring used to determine the score.

2. The method of claim 1, wherein determining the score for the entity comprises determining the score based, at least in part, on one or more search terms of one or more queries of the initial ontology performed by a neighbor of a current user.

3. The method of claim 2, wherein the neighbor is determined based, at least in part, on a location of the neighbor with respect to the current user.

4. The method of claim 2, wherein the neighbor is determined based, at least in part, on demographic information of the neighbor and the current user.

5. The method of claim 1, wherein the score is based, on at least in part, a domain of the document corpus.

6. The method of claim 1, wherein the score comprises a probability vector for the entity.

7. The method of claim 6, wherein the probability vector includes a first score for the node representing the entity and a second score for a parent node of the node.

8. A computer program product for ontology generation, the computer program product comprising a computer readable storage medium having program instructions embodied therewith, the program instructions executable by one or more processors of a device, the program instructions configured to:

receive, via one or more processors, a document corpus having a plurality of documents;

determine, via at least one of the processors a set of entities for a sentence in the plurality of documents; and for an entity in the set of entities, generating a set of search keywords that are associated with the entity;

executing a query against the plurality of documents using the set of search keywords;

determining a link to a first node in an initial ontology based on a keyword-based search result of the query, wherein search result indicates that the first node is associated with a plurality of first categories in the initial ontology based on an association between a keyword in the set of search keywords and the first node;

creating a probability vector associated with the plurality of categories, wherein the probability vector indicates first likelihoods the entity refers to each of the plurality of first categories;

determining parent nodes to the first node in the initial ontology, wherein the parent nodes are associated with a plurality of second categories;

indicating, in the probability vector, second likelihoods the entity refers to the plurality of second categories, wherein the second likelihoods are less than the first likelihoods;

determining, via a scoring engine operating via at least one of the processors, a score for the entity based, at least in part, on the first likelihoods and the second likelihoods; and generating a new ontology by removing, via an ontology pruner operating via at least one of the processors, the entity from the initial ontology if the score is below a predetermined or configurable threshold value, wherein the ontology pruner iteratively prunes the entity from the new ontology via a plurality of iterations, wherein each of the plurality of iterations is based on a different type of scoring used to determine the score.

9. The computer program product of claim 8, wherein the program instructions to cause the device to determine the score for the entity include program instructions to determine the score based, at least in part, on one or more search terms of one or more queries of the initial ontology performed by a neighbor of a current user.

10. The computer program product of claim 9, wherein the neighbor is determined based, at least in part, on a location of the neighbor with respect to the current user.

11. The computer program product of claim 9, wherein the neighbor is determined based, at least in part, on demographic information of the neighbor and the current user.

12. The computer program product of claim 8, wherein the score is based, at least in part, on a domain of the document corpus.

13. The computer program product of claim 8, wherein the score comprises a probability vector for the entity.

14. The computer program product of claim 13, wherein the probability vector includes a first score for the node representing the entity and a second score for a parent node of the node.

15. A device comprising: one or more processors; and a computer readable storage medium communicably coupled to the one or more processors, the computer readable storage medium having stored thereon program instructions, that when executed, cause the device to perform operations for ontology generation, the program instructions configured to:

receive, via one or more processors, a document corpus having a plurality of documents;

determine, via at least one of the processors a set of entities for a sentence in the plurality of documents; and for an entity in the set of entities, generating a set of search keywords that are associated with the entity;

executing a query against the plurality of documents using the set of search keywords;

determining a link to a first node in an initial ontology based on a keyword-based search result of the query, wherein search result indicates that the first node is associated with a plurality of first categories in the initial ontology based on an association between a keyword in the set of search keywords and the first node;

creating a probability vector associated with the plurality of categories, wherein the probability vector indicates first likelihoods the entity refers to each of the plurality of first categories;

determining parent nodes to the first node in the initial ontology, wherein the parent nodes are associated a plurality of with second categories;

indicating, in the probability vector, second likelihoods the entity refers to the plurality of second categories, wherein the second likelihoods are less than the first likelihoods;

determining, via a scoring engine operating via at least one of the processors, a score for the entity based, at least in part, on the first likelihoods and the second likelihoods; and generating a new ontology by removing, via an ontology pruner operating via at least one of the processors, the entity from the initial ontology if the score is below a predetermined or configurable threshold value, wherein the ontology pruner iteratively prunes the entity from the new ontology via a plurality of iterations, wherein each of the plurality of iterations is based on a different type of scoring used to determine the score.

16. The device of claim 15, wherein the program instructions to cause the device to determine the score for the entity include program instructions to determine the score based, at least in part, on one or more search terms of one or more queries of the initial ontology performed by a neighbor of a current user.

17. The device of claim 16, wherein the neighbor is determined based, at least in part, on a location of the neighbor with respect to the current user.

18. The device of claim 16, wherein the neighbor is determined based, at least in part, on demographic information of the neighbor and the current user.

19. The device of claim 15, wherein the score is based, at least in part, on a domain of the document corpus.

20. The device of claim 15, wherein the score comprises a probability vector for the entity that includes a first score for the node representing the entity and a second score for a parent node of the node.

* * * * *